US008810208B2

(12) United States Patent
Krauer et al.

(10) Patent No.: US 8,810,208 B2
(45) Date of Patent: Aug. 19, 2014

(54) CHARGING EFFICIENCY USING SELECTABLE ISOLATION

(75) Inventors: Jean-Pierre Krauer, San Jose, CA (US); Nicholas Robert Kalayjian, San Carlos, CA (US); Troy A. Nergaard, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 821 days.

(21) Appl. No.: 13/045,432

(22) Filed: Mar. 10, 2011

(65) Prior Publication Data
US 2012/0229098 A1 Sep. 13, 2012

(51) Int. Cl.
H02J 7/04 (2006.01)
H02M 3/337 (2006.01)
H02J 7/00 (2006.01)

(52) U.S. Cl.
CPC .......... *H02M 3/3376* (2013.01); *H02J 7/0052* (2013.01); *Y02E 70/40* (2013.01); *H02J 2007/0059* (2013.01)
USPC ............................ 320/140; 320/109; 320/137

(58) Field of Classification Search
CPC .................................................... H02J 7/0052
USPC ......................................... 320/109, 137, 140
See application file for complete search history.

(56) References Cited

U.S. PATENT DOCUMENTS

| | | | |
|---|---|---|---|
| 5,940,280 A | 8/1999 | Murai et al. | |
| 6,917,124 B2 * | 7/2005 | Shetler et al. | 307/66 |
| 2009/0140698 A1 | 6/2009 | Eberhard et al. | |
| 2009/0140700 A1 | 6/2009 | Eberhard et al. | |
| 2009/0143929 A1 | 6/2009 | Eberhard et al. | |
| 2009/0167254 A1 | 7/2009 | Eberhard et al. | |
| 2009/0212745 A1 | 8/2009 | Kelty et al. | |
| 2009/0216688 A1 | 8/2009 | Kelty et al. | |
| 2010/0222953 A1 | 9/2010 | Tang | |
| 2011/0012562 A1 | 1/2011 | Paryani | |
| 2011/0077879 A1 | 3/2011 | Paryani | |
| 2012/0019212 A1 | 1/2012 | Krauer | |
| 2012/0133326 A1 * | 5/2012 | Ichikawa et al. | 320/109 |
| 2012/0161700 A1 * | 6/2012 | Chiang et al. | 320/109 |

OTHER PUBLICATIONS

Cox N R: "A universal power converter for emergency charging of electric vehicle batteries" Applied Power Electronics Conference and Exposition, 1995. APEC '95. Conference Proceedings 1995., Tenth Annual Dallas, TX, USA Mar. 5-9, 1995, New York, NY, USA, IEEE, US, Mar. 5, 1995, pp. 965-969, XP010147691, DOI : 10 . 1109/APEC . 1995.469057 ISBN :978-0-7803-2482-4.

* cited by examiner

*Primary Examiner* — Drew A Dunn
*Assistant Examiner* — Nathaniel Pelton
(74) *Attorney, Agent, or Firm* — J. Richard Soderberg (57) ABSTRACT

The apparatus for charging an energy storage system (ESS) from an AC line voltage includes a boost stage for converting the AC line voltage to a first ESS charging voltage; an isolation stage, coupled to the boost stage, for converting the first ESS charging voltage to a second ESS charging voltage with the second ESS charging voltage less than the first ESS charging voltage, the isolation stage removing a common mode current between the ESS and the boost stage; a configurator, responsive to a control signal, to set a direct communication of the first ESS charging voltage to the ESS in a bypass mode and to open the direct communication of the first ESS charging voltage to the ESS in an isolation mode; and a controller, coupled to the configurator, for setting the modes responsive to a battery voltage, a peak of the AC line voltage, and a total leakage current at an input of the AC line voltage, the controller asserting the control signal to the configurator.

10 Claims, 4 Drawing Sheets

CHARGING EFFICIENCY USING SELECTABLE ISOLATION

BACKGROUND OF THE INVENTION

The present invention relates generally to chargers for energy storage systems, and more specifically, but not exclusively, to improvements in universal input charger efficiency.

Chargers for plug-in electric vehicles convert AC input voltage to an appropriate DC charging voltage applied to the energy storage system. Efficiencies in the charging process are particularly important because of the relatively large amounts of energy transferred and stored during the frequent charging cycles. Those responsible for charging systems and methods are always looking for ways to improve charging efficiency.

One fundamental charger design includes two stages, a boost stage and an isolation stage. The boost stage provides a power factor correction front end that is required of all commercial charging systems for electric vehicles. The isolation stage provides isolation of the energy storage system from the AC input line and a buck output. The isolation removes any common mode currents that would be present in the case that the isolation was not present, and the buck component allows the energy storage system to be at a much lower voltage than the boost output stage. For example, assume that the efficiency of the boost stage is around M % and the efficiency of the isolation stage is around N %, there is a total efficiency of P %, where P is less than both M and N because M and N are each less than 1.

What is needed is an improved charger and charging method that improves charging efficiency.

BRIEF SUMMARY OF THE INVENTION

Disclosed is an improved charger and charging method that improves charging efficiency. The following summary of the invention is provided to facilitate an understanding of some of technical features related to improved chargers and charging methods, and is not intended to be a full description of the present invention. A full appreciation of the various aspects of the invention can be gained by taking the entire specification, claims, drawings, and abstract as a whole.

The apparatus for charging an energy storage system (ESS) from an AC line voltage includes a boost stage for converting the AC line voltage to a first ESS charging voltage; an isolation stage, coupled to the boost stage, for converting the first ESS charging voltage to a second ESS charging voltage with the second ESS charging voltage less than the first ESS charging voltage, the isolation stage removing a common mode current between the ESS and the boost stage; a configurator, responsive to a control signal, to set a direct communication of the first ESS charging voltage to the ESS in a bypass mode and to open the direct communication of the first ESS charging voltage to the ESS in an isolation mode; and a controller, coupled to the configurator, for setting the modes responsive to a battery voltage, a peak of the AC line voltage, and a total leakage current at an input of the AC line voltage, the controller asserting the control signal to the configurator.

The method for charging an energy storage system (ESS) from an AC line voltage includes a) measuring an AC input voltage for each phase of the AC line voltage; b) calculating an input leakage current responsive to a Y impedance at an input for the AC line voltage; c) calculating an ESS leakage current due to an ESS bus Y impedance to ground; d) testing whether a total leakage current, including a sum of the input leakage current and the ESS leakage current, exceeds a predetermined value; e) testing whether a peak voltage for the AC line voltage exceeds a voltage of the ESS; and f) charging the ESS from the AC line voltage using a non-isolated boost stage resulting from bypassing an isolation stage including a buck conversion function when both the tests at step e) and step f) are negative; and otherwise; g) charging the ESS from the AC line voltage using both the boost stage and the isolation stage when either the tests at step e) and step f) are affirmative.

Through the structure and process of the present invention, overall charging efficiency is increased. The present invention recognizes those charging scenarios in which a less efficient configuration is not required and reconfiguring the charging to the more efficient mode whenever possible.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide an improved charger and charging method that improves charging efficiency. The following description is presented to enable one of ordinary skill in the art to make and use the invention and is provided in the context of a patent application and its requirements. In the following text, the terms "energy storage assembly," "battery," "cell," "battery cell," "battery cell pack," "electrolytic double-layer capacitor," and "ultracapacitor" may be used interchangeably (unless the context indicates otherwise" and may refer to any of a variety of different rechargeable configurations and cell chemistries including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other chargeable high energy storage type/configuration.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Embodiments of the present invention are applicable to systems that employ electric motors in general, and more specifically (but not exclusively) to vehicles using multiphase electric induction motors. Electric vehicles (EVs) include vehicles that have one or more sources of stored energy designed to provide electrical energy to the vehicle, wherein the electrical energy is used to at least in part to provide some energy used to propel the vehicle. Electric vehicles may include vehicles designed to carry passengers, to transport goods, or to provide specialty work capabilities. For example, electric vehicles include passenger automobiles, trucks, and recreational watercrafts such as boats. In addition, electric vehicles include specialty vehicles, such as fork trucks used to lift and move cargo, vehicles that incorporate conveyor belts to move objects, such as mobile conveyor belt vehicles used to load and unload cargo such as luggage from airplanes, and specialty equipment used in areas where exhaust fumes from typical gasoline, diesel, or propane powered equipment may present hazards to personnel, such as in underground mining operations. In various instances, electric vehicles are designed and intended to be operated on public highways as licensed automobiles, including both cars and trucks.

Generally, an electric vehicle includes some form of a device or devices capable of storing energy and that is operable to provide electrical power to the vehicle. The electrical power may be used to at least in part provide energy for propelling the vehicle. In some instances, the electrical power is used to provide the energy required for all of the vehicle's functions, including propelling the vehicle. In many instances, the source of the stored energy is a rechargeable battery pack. In various embodiments, a rechargeable battery pack includes a plurality of individual rechargeable battery cells that are electrically coupled to provide a rechargeable battery pack.

Figure 1:
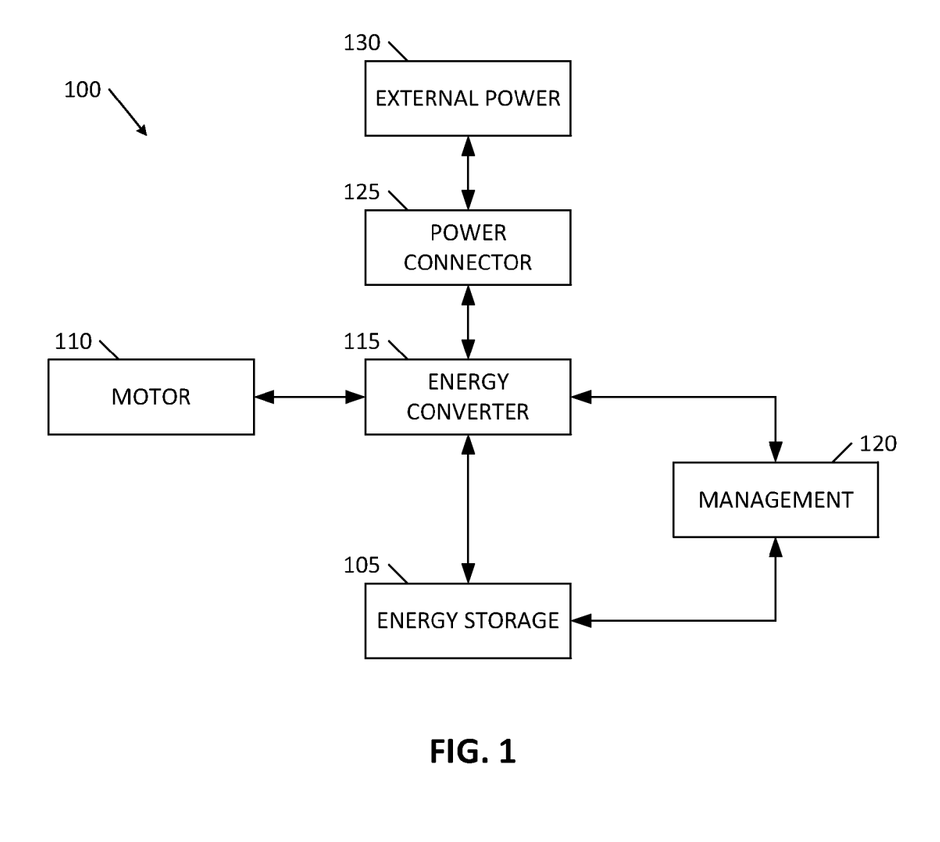
FIG. 1 illustrates a schematic block diagram for a representative electric motor system incorporating a preferred embodiment of the present invention.

FIG. 1 is a schematic block diagram for a representative electric motor system 100 incorporating a preferred embodiment of the present invention. To simplify further discussion, system 100 will be described below in the context of an electric vehicle. However it is understood that system 100 may be part of another device or system other than an electric vehicle. System 100 includes an energy storage system (ESS) 105 that includes a vehicle propulsion battery or the like and at least one propulsion motor 110 for converting energy into mechanical motion, such as rotary motion. ESS 105 includes various components associated with transmitting energy to and from the vehicle propulsion battery in various examples, including safety components, cooling components, heating components, rectifiers, and the like. ESS 105 may be implemented in many different ways and include many different components, but for purposes of this example, ESS 105 includes a propulsion battery, ultracapacitor, or the like. Thus, the present subject matter should not be construed to be limited to the configurations disclosed herein, as other configurations are possible and within the scope of the present invention.

The propulsion battery of ESS 105 of this example includes one or more lithium ion batteries. In some examples, the battery includes a plurality of lithium ion batteries coupled in parallel and/or series. Some examples include cylindrical lithium ion batteries. In some cases, ESS 105 includes one or more batteries compatible with the 18650 battery standard, but the present subject matter is not so limited. Some examples include approximately 2981 batteries which are interconnected. The vehicle propulsion battery used in ESS 105, in some examples, provides approximately 390 volts.

Additionally system 100 includes an energy converter 115. Energy converter 115 converts energy from ESS 105 into energy useable by motor 110. In some instances, there is energy flow from motor 110 into ESS 105 through energy converter 115. ESS 105 transmits energy to energy converter 115, which converts the transmitted energy into energy usable by motor 110 to propel the electric vehicle. Motor 110 may also generate energy that is transmitted to energy converter 115. In these instances, energy converter 115 converts the transmitted energy from motor 110 into energy which may be stored in ESS 105. As shown below in connection with an exemplary FIG. 2, energy converter 115 includes semiconductor power devices such as transistors. These transistors may include one or more field effect transistors. Some examples include metal oxide semiconductor field effect transistors. Some examples include one or more insulated gate bipolar transistors. As such, in various examples, the energy converter 115 includes switching elements which are configured to receive direct current (DC) power from ESS 105 and to output multiphase (e.g., three-phase) alternating current (AC) to power motor 110. As noted above, it is sometimes the case that energy converter 115 is configured to convert a three-phase output from motor 110 to DC power to be stored in ESS 105. Some configurations of energy converter 115 convert energy from ESS 105 into energy usable by electrical loads other than motor 110. Some of these examples switch energy from approximately 390 Volts of ESS 105 to 14 Volts (DC).

In this example, motor 110 is a three phase AC motor. Sometimes system 100 may include a plurality of such motors. The vehicle optionally includes a transmission, such as a 2-speed transmission, though other examples are possible. Manually clutched transmissions are contemplated, as are those with hydraulic, electric, or electrohydraulic clutch actuation. Some examples employ a dual-clutch system that, during shifting, phases from one clutch coupled to a first gear to another coupled to a second gear. Rotary motion is transmitted from the transmission to the wheels via one or more axles.

A management system 120 is optionally provided which provides control for one or more of ESS 105 and energy converter 115. In some cases, management system 120 is coupled to a vehicle system which monitors safety (such as a crash sensor). In some examples management system 120 is coupled to one or more driver inputs (such as a speed adjuster, colloquially termed a throttle, although the present subject matter is not limited to examples having an actual throttle). Management system 120 is configured to control power to one or more of ESS 105 and energy converter 115.

A power connector 125 accesses an external power source 130, e.g., a charging station, to receive energy and communicate it with ESS 105 through energy converter 115. In some examples, the charging station converts power from a single phase 110V AC power source into power storable by ESS 105. In additional examples, the charging station converts power from a 220V AC power source into power storable by ESS 105. Some implementations include single-phase line voltages while others employ polyphase line voltages. FIG. 1 illustrates an implementation in which energy converter 115 converts power from energy source 130 to energy storable by ESS 105.

The exemplary voltages described in the preceding paragraph are generally applicable to North America. Other locations often use different magnitude and frequency for the AC line voltages available for charging. The preferred embodiments of the present invention contemplate a universal charging system that may be employed in virtually any geographic market. Energy converter 115 is adapted to provide efficient charging without regard to variations in the AC line voltages (including variations within any particular system and variations across systems).

The components of system 100 are complex and provide multilayer interactions whenever components or subsystems are changed or optimized for one concern, the change can propagate through other components and subsystems. For example, embodiments of the present invention are optimized across many variables and operating conditions. One important consideration has been to address common mode currents when charging. It is the case that under some circumstances, engaging power connector 125 with the external AC power source 130 can create leakage currents large enough to trip residual-current devices (RCD) also commonly referred to in the US as ground fault circuit interrupter (GFCI). A problem occurs when the RCD trips and charging is suspended when the operator anticipated that the charging would have been completed. To avoid situations like that, it is important to properly anticipate and account for situations when leakage currents could be large enough to trip a RCD.

Energy converter 115 is designed to provide isolation from ESS 105 to external power source 130 which reduces any chance of excessive leakage current from normal operation. The charging model for converter 115 thus includes the standard boost stage and an isolation stage with the buck conversion subsystem.

In "normal" operation, a user connects external power 130 to power connector 125. The voltage of external power 130 is less than the voltage across the chargeable energy storage element of ESS 105, therefore energy converter 115 "boosts" the voltage level in order to charge ESS 105 to the desired state-of-charge (SOC). Energy converter 115 operates in a boost mode for this normal operation. When the desired SOC is reached, charging is suspended.

There is the special case when the voltage of external power 130 is greater than the voltage of the relevant storage element of ESS 105. In this case, typical prior art configurations for energy converter 115 could result in uncontrolled current flows, potentially damaging components of system 100. To reduce risks of this happening, energy converter 115 is changed from the boost mode to a boost-buck mode. In the boost-buck mode, energy converter 115 down converts the voltage from external power 130 to the appropriate voltage level for charging.

The special case may occur for several different reasons, including variations in the amplitude of the voltage of external power 130 above its nominal value, or because the voltage across ESS 105 is low because of a depleted SOC. Sense circuitry monitors the voltage of external power 130 and compares it to the voltage across ESS 105. To err on the side of caution, a safety margin is built-in to switch energy converter 115 to the boost-buck mode when the voltage of external power 130 has a predetermined relationship to the voltage across ESS 105 that is close to the risk point. For example, when the voltage of external power 130 is at least 95% (other values are possible for the threshold but less than 100%) of the voltage of ESS 105, energy converter 115 may be switched to the boost-buck mode. For the special mode, when sufficient energy has been added into ESS 105, and/or when the line voltage changes, so that the voltage of ESS 105 exceeds the line voltage by a sufficient margin, energy converter 115 is reconfigured for the normal operation and changes from the boost-buck mode to the boost mode.

When the isolation stage also helps to protect against undesired consequences of common mode currents, it may be necessary to use the isolated boost-buck mode even in the case when the peak AC line voltage is sufficiently less than the ESS voltage. For example, when leakage currents exceed a threshold value, the isolation of the boost-buck mode are still used to reduce risks of tripping the RCD.

Charging is somewhat faster in the boost mode than in the boost-buck mode, with the boost mode also more efficient, so it is desirable to operate energy converter 115 in boost mode whenever it is "appropriate" to operate in a boost-only configuration. The boost-buck mode is advantageous for the special case and permits charging to occur when it otherwise would have needed to have been suspended. The boost-buck mode includes a further advantage of being able to provide very low charging voltages, such as the type of voltage that is useable to repair a storage element that has had too much energy depleted. Special charging procedures are often necessary to repair such a storage element, and those special charging procedures often require a very low charging voltage.

What is "appropriate" (and identifying the "appropriate" configuration) becomes increasingly more complex as the charging system becomes more optimized and handles a range of considerations when desiring to operate in the more efficient boost-mode.

Figure 2:
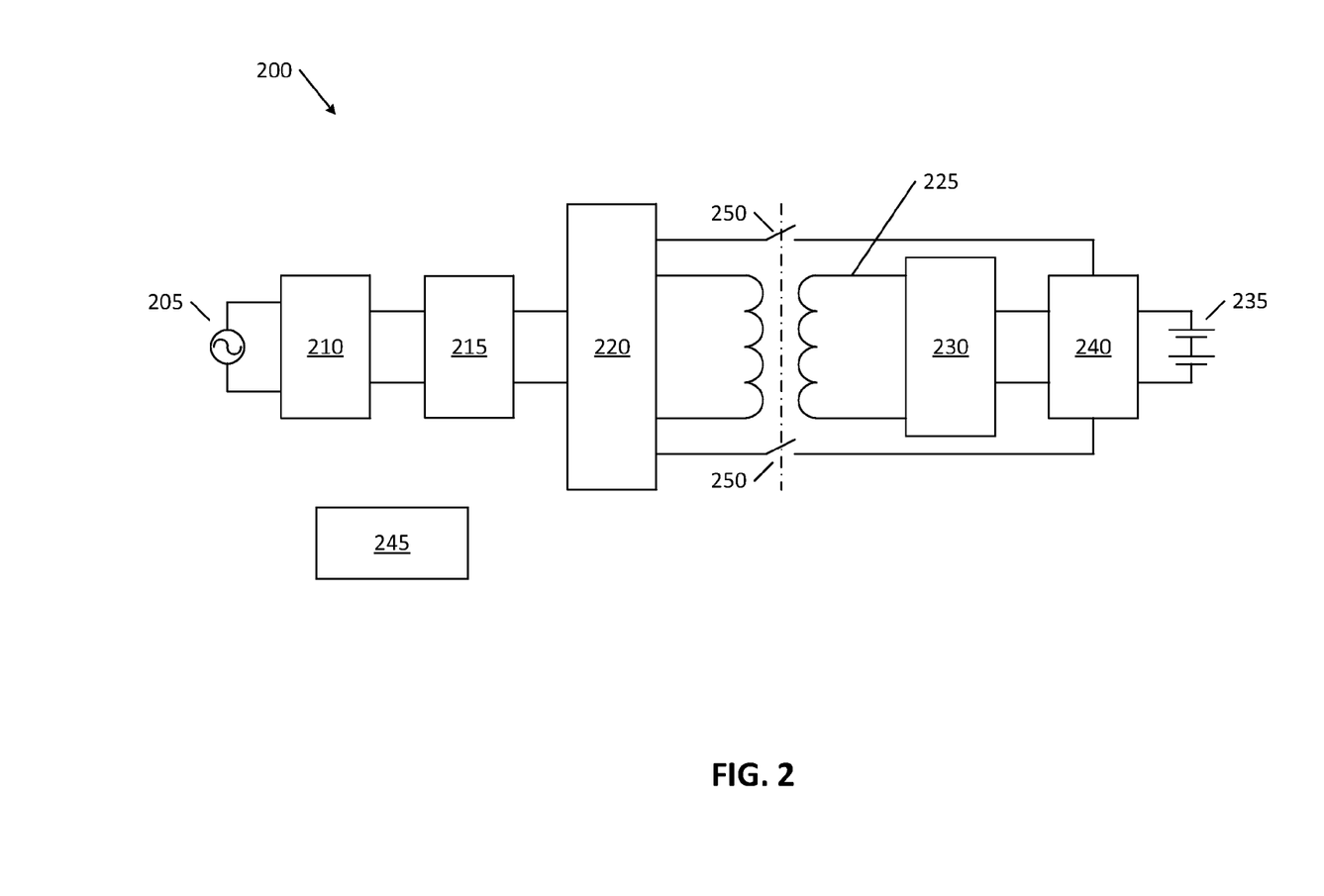
FIG. 2 illustrates a simplified schematic diagram of a charging configuration model for the system including the energy converter shown in FIG. 1.

FIG. 2 illustrates a simplified schematic diagram of a charging configuration model 200 for system 100 including energy converter 115 shown in FIG. 1. (As noted herein, the actual energy converter is very complex and handles many different functions. Model 200 is not provided to be a complete diagram of an entire energy converter, but is shown simplified to better enable the reader to focus on the improvements and details of the present invention relating to an intelligent double-mode efficient universal charger.) To further simplify FIG. 2, model 200 is shown for a single phase. As discussed herein particularly with respect to FIG. 1, motor 110 is a polyphase motor (e.g., three phase), and energy converter 115 interfaces to each phase of motor 110.

Model 200 includes an AC line voltage source 205 providing AC charging voltage. An electromagnetic interference (EMI) filter 210 and a full wave bridge (FWB) 215 process and condition the AC charging voltage from source 205 and communicate it to a boost stage 220. Boost stage 220 increases ("boosts") the AC charging voltage. An isolation stage, including an isolation transformer 225 and a buck sub-stage 230 receive the boosted AC and decrease the boosted AC charging voltage and isolates the AC line voltage source 205 from an energy storage system (ESS) 235. Preferably a voltage conditioner function 240 is interposed between the boosted/bucked AC charging voltage and ESS 235 to ensure that the charging voltage applied to ESS 235 has the correct format. Operation of the stages, including motor, switches, contactors and the like, is shown controlled by a controller function 245.

Model 200 includes a pair of contactors/relays 250 communicating the boosted AC line voltage output from boost stage 220 directly to conditioner function 240 and by-passing the isolation stage (i.e., isolation transformer 225 and buck sub-stage 230). (Other configurations are possible, for example relays 250 could in some embodiments be connected to the input "rectifier side" to the buck inductor for added filtering.) As explained in more detail below, controller 245 controls contactors 250 to set a non-isolated "boost" only mode (closing contactors 250) and to set an isolated "boost-buck" mode (opening contactors 250) as appropriate.

Figure 3:
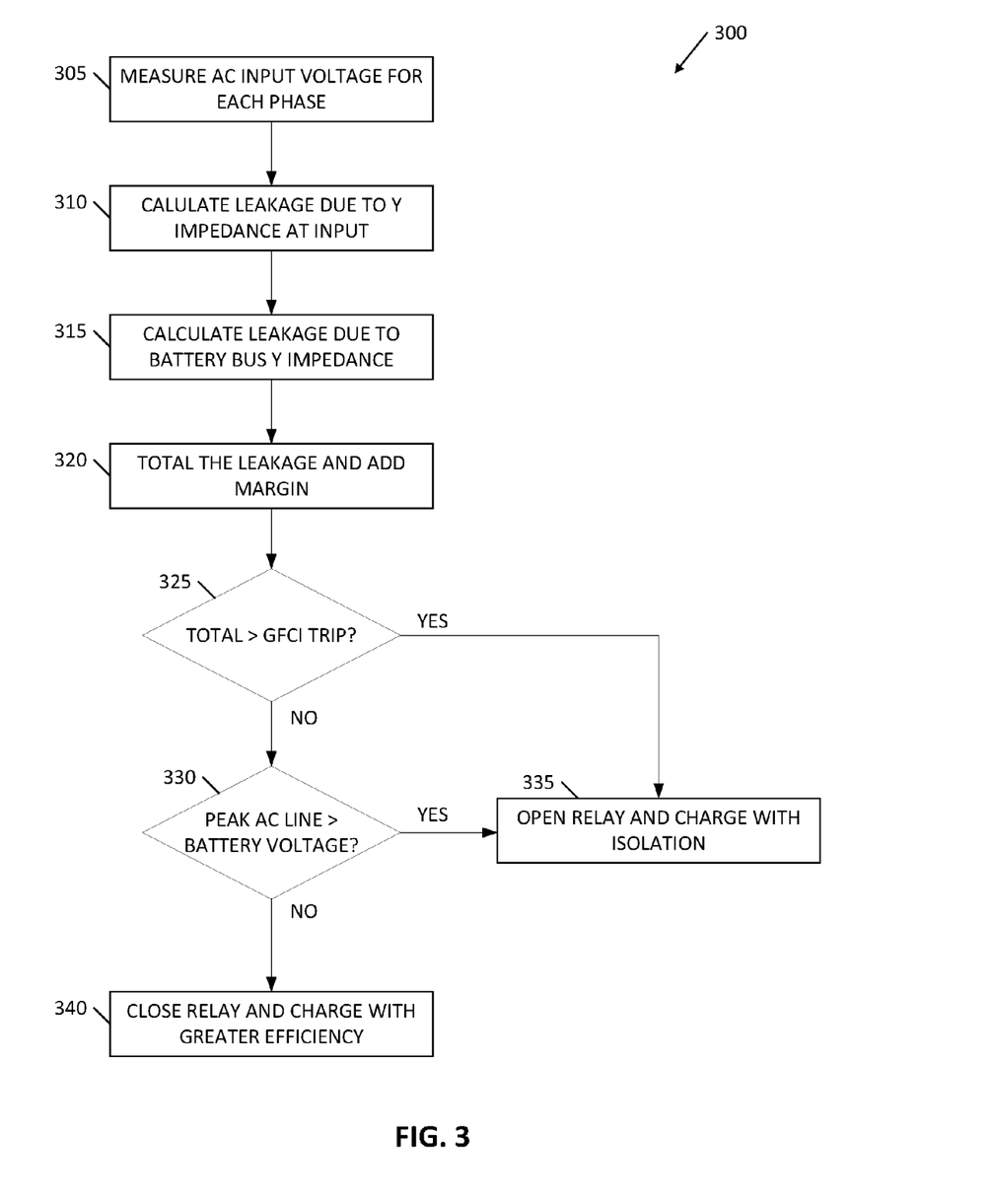
FIG. 3 illustrates a control process for setting the operational mode of the charging model by setting the state of a set of contactors.

FIG. 3 illustrates a control process 300 for setting the operational mode of model 200 by setting the state of contactors 250. Process 300 begins at step 305 and measures the AC input voltage of each phase. Next at step 310, process 300 calculates the leakage due to Y impedance at the input for the AC input voltage. Following step 310, process 300 calculates the leakage due to a Y impedance of a bus for the ESS (step 315). Process 300 then (at step 320) totals the calculated leakages from step 315 and step 320 and adds a predetermined margin.

At step 325, process 300 tests whether this total (leakage plus margin) exceeds the trip level of the RCD. When the test at step 325 is negative, process 300 next (step 330) tests whether the peak AC line voltage exceeds the voltage of the ESS. When either test at step 325 or step 330 is positive, then process 300 performs step 335 to open contactor 250 shown in FIG. 2 to charge the ESS in the isolated boost-buck configuration. However, when the test at step 330 is also negative like step 325, then process 300 performs step 340 to close contactor 250. Closing contactor 250 charges the ESS in the non-isolated boost-only configuration.

Figure 4:
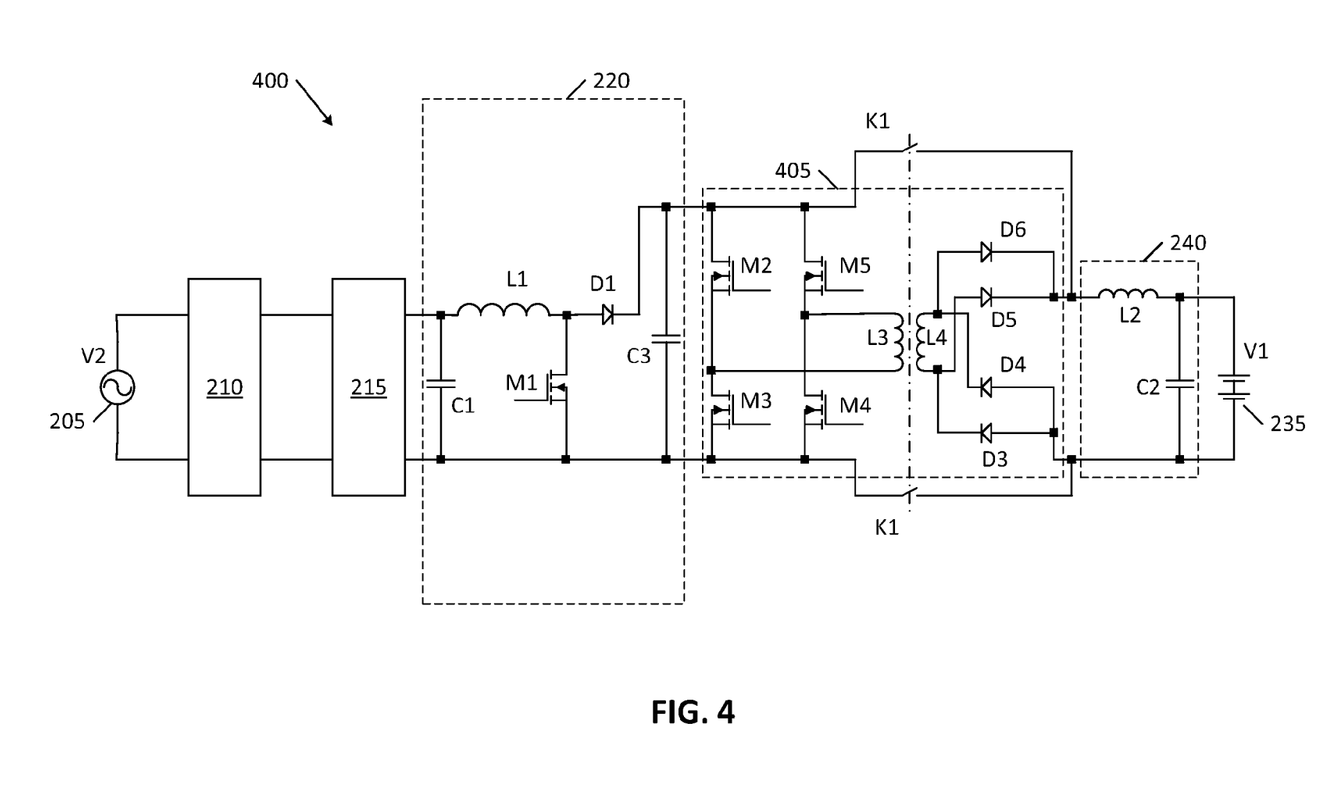
FIG. 4 illustrates a more detailed charging model for energy the converter when used for charging the energy storage system.

FIG. 4 illustrates a more detailed charging model 400 for energy converter 115 used for charging. Representative components for an exemplary charging configuration are included for model 400. Boost stage 220 is shown including a boost inductor L1, NMOS switch M1, a diode D1 and capacitor C3. There is shown the isolation stage as circuit 405 which includes the isolation transformer (L3 and L4) and buck components. Other configurations for a boost stage are possible, of course.

Boost stage 220 provides the power factor correction (PFC) front-end is required of all commercial charging systems. Isolation stage 405 isolates ESS 235 from AC line voltage source 205, removes any common mode currents that would be present but—for the isolation, and includes a buck stage to permit charging when the voltage of ESS 235 is much lower than the boost output stage. Assuming a charging efficiency of 96% for boost stage 220 and a charging efficiency of 97% for isolated buck stage 405, then the total overall charging efficiency is about 93%. Bypassing isolation buck stage 405 increases the effective charging efficiency to the 96% level. The improved efficiency is achieved by simply adding two relatively inexpensive contactors and suitably modifying controller 245 to open and close these contactors when appropriate to make use of the improved efficiency.

There is a further advantage to use of embodiments of the present invention. The use of the isolation bypass function (for example the pair of relays) as shown in the disclosed embodiments enables improved efficiencies for bi-directional operation. Some implementations are designed so that the system is able to charge from AC line as well as to discharge into the AC line. Discharging enables the ESS to be used as an AC power source when not driving. Possible uses include powering an AC operated device or to supply the grid with additional energy from the ESS when the grid needs power. The configuration enhances the efficiency of such bi-directional implementations.

When charging with a single boost stage the common mode current is a direct consequence of the AC input voltage and the Y capacitance and Y resistance of the charger at the input and the average of the two input voltages across the battery bus Y capacitance and Y resistance. There are several standards for AC voltages around the world, some are balanced and some are not balanced. Leakage current in the preferred embodiment is calculated based on the AC voltage present at each phase relative to ground and the Y impedance of that phase to ground. The leakage due to the battery bus is the average of the two input phase voltages across the battery bus total Y impedance to chassis. After the leakage current from each input phase is calculated, simple subtraction of these values determines the contribution of the leakage current to the RCD. The input leakage current gets added to the battery leakage for a total leakage current. The preferred embodiments account for tolerances to RCD detectors as well as any harmonics and noise by adding a margin. The calculated total (absent margin) is the best case and one should leave some margin to ensure the RCD does not trip (e.g., testing/characterization of the systems and components is one way to determine the appropriate margin). Some embodiments include an on board RCD current sensor to measure the leakage to make corrections to the calculated leakage.

The following are equations used to calculate the leakage current in the battery charger due to input Y impedance:

$$\text{Input\_current}_{phase1} := \frac{V_{sine\_rms\_phase1} \times \sqrt{2} \times \sin(2\pi \times \text{frequency} + \text{Phase})}{\text{input\_impedance\_phase1}} \quad (1)$$

$$\text{Input\_current}_{phase2} := \frac{V_{sine\_rms\_phase2} \times \sqrt{2} \times \sin(2\pi \times \text{frequency} + \text{Phase})}{\text{input\_impedance\_phase2}} \quad (2)$$

$$Y\_\text{input\_GFCI}_{current} := \text{Input\_current}_{phase1} - \text{Input\_current}_{phase2} \quad (3)$$

The following are equations for leakage current due to battery bus impedance to ground:

$$V_{battery\_common\_mode} := \sqrt{\frac{\int_0^{\frac{1}{f_{line}}} \left[ \frac{v_{Phase1_{rms}} \times \sqrt{2} \times (\sin(\omega t)) + v_{Phase2_{rms}} \times (\sin(\omega t + \theta_{diff}))}{2} \right]^2 dt}{\frac{1}{f_{line}}}} \quad (4)$$

$$I_{leakage\_battery\_bus} := \frac{V_{battery\_common\_mode}}{Z_{battery\_bus\_impedance}} \quad (5)$$

The total leakage current that the RCD measures is:

$$I_{leakages\_total} := I_{leakage\_battery\_bus} + Y\_\text{input\_GFCI}_{current} \quad (6)$$

Table I below provides example leakage current for various AC voltages with a single stage boost supply ignoring any added currents due to noise and harmonics.

TABLE I

| Voltage | Line Description | Input Balanced Resistance | Balanced capacitance from battery bus | Input Y capacitance | leakage W/O harmonics |
|---|---|---|---|---|---|
| 120 Vac | Line to Neutral | 750K | 57 nF | 4.7 nF | 2.67 mA |
| 208 Vac | 2 hots 120 deg apart | 750K | 57 nF | 4.7 nF | 2.6 mA |

TABLE I-continued

| Voltage | Line Description | Input Balanced Resistance | Balanced capacitance from battery bus | Input Y capacitance | leakage W/O harmonics |
|---|---|---|---|---|---|
| 220 Vac | 2 hots 180 deg apart | 750K | 57 nF | 4.7 nF | 99 uA |
| 240 Vac | 2 hots 180 deg apart | 750K | 57 nF | 4.7 nF | 108 uA |
| 250 Vac | Line to Neutral | 750K | 57 nF | 4.7 nF | 5.57 mA* |
| 250 Vac | 250 VAC (124 V and 150 V 120 Deg Apart) | 750K | 57 nF | 4.7 nF | 3.3 mA |

*(Current exceeds threshold and requires isolated mode operation)

As described earlier, a typical trip value for leakage current is about 5 mA (in the United States, the National Electrical Code requires GFCI devices installed to protect people are set to interrupt the protected circuit whenever leakage current exceeds a range of 4-6 mA within 25 ms). Therefore when the leakage current is 5.57 mA (see flagged entry), the charging system must operate in the isolated mode while in all the others the system may operate in the non-isolated mode, which is the more efficient mode. As noted herein, the system and process are most preferably implemented in the context of a universal input charger for electric vehicles for improved charger efficiency. Other implementations and applications are possible, just as it is possible to implement the features and stages of the system and method in different ways.

The system and methods above has been described in general terms as an aid to understanding details of preferred embodiments of the present invention. Other preferred embodiments of the present include the described application for improving charging efficiency. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An apparatus for charging an energy storage system (ESS) from an AC line voltage, comprising:
   a boost stage for converting the AC line voltage to a first ESS charging voltage;
   an isolation stage, coupled to the boost stage, for converting the first ESS charging voltage to a second ESS charging voltage with the second ESS charging voltage less than the first ESS charging voltage, the isolation stage removing a common mode current between the ESS and the boost stage;

a switching system, responsive to a control signal, to set a direct communication of the first ESS charging voltage to the ESS in a bypass mode and to open the direct communication of the first ESS charging voltage to the ESS in an isolation mode; and a controller, coupled to the switching system, for setting the modes responsive to a battery voltage, a peak of the AC line voltage, and a total leakage current at an input of the AC line voltage, the controller asserting the control signal to the switching system;

wherein a residual-current device (RCD) trip level is associated with a source for the AC input voltage and wherein the controller asserts the control signal to set the bypass mode when both the battery voltage is above the peak of the AC line and the leakage current is below the RCD trip level.

2. The apparatus of claim 1 wherein the isolation stage includes an isolation transformer and a buck function wherein the switching system bypasses the isolation transformer and the buck function in the bypass mode.

3. The apparatus of claim 2 wherein the switching system includes a pair of contactor relays.

4. The apparatus of claim 1 wherein the total leakage current is calculated responsive to a AC voltages present at each phase relative to ground and a Y impedance of each phase to ground as well as leakages including an average of two input phase voltages across an ESS bus total Y impedance.

5. The apparatus of claim 4 wherein the total leakage current includes an added current safety margin to account at least partially for additional leakage components including harmonics and noise.

6. The apparatus of claim 4 further comprising a leakage sensor to correct the total leakage current.

7. The apparatus of claim 5 further comprising a leakage sensor to correct the total leakage current.

8. A method for charging an energy storage system (ESS) from an AC line voltage, the method comprising the steps of:
   a) measuring an AC input voltage for each phase of the AC line voltage;
   b) calculating an input leakage current responsive to a Y impedance at an input for the AC line voltage;
   c) calculating an ESS leakage current due to an ESS bus Y impedance to ground;
   d) testing whether a total leakage current, including a sum of the input leakage current and the ESS leakage current, exceeds a predetermined value;
   e) testing whether a peak voltage for the AC line voltage exceeds a voltage of the ESS; and
   f) charging the ESS from the AC line voltage using a non-isolated boost stage resulting from bypassing an isolation stage including a buck conversion function when both the tests at step d) and step e) are negative; and
   otherwise;
   g) charging the ESS from the AC line voltage using both the boost stage and the isolation stage when either the tests at step e) and step f) are affirmative.

9. The method of claim 8 wherein the total leakage current in step d) includes an added margin to at least partially compensate for one or more harmonics and noise.

10. The method of claim 8 further comprising a current sensor for correcting the total leakage current used in step d).

* * * * *